(No Model.)
R. C. BUCKLEY.
WHEEL CULTIVATOR.
No. 403,414. Patented May 14, 1889.
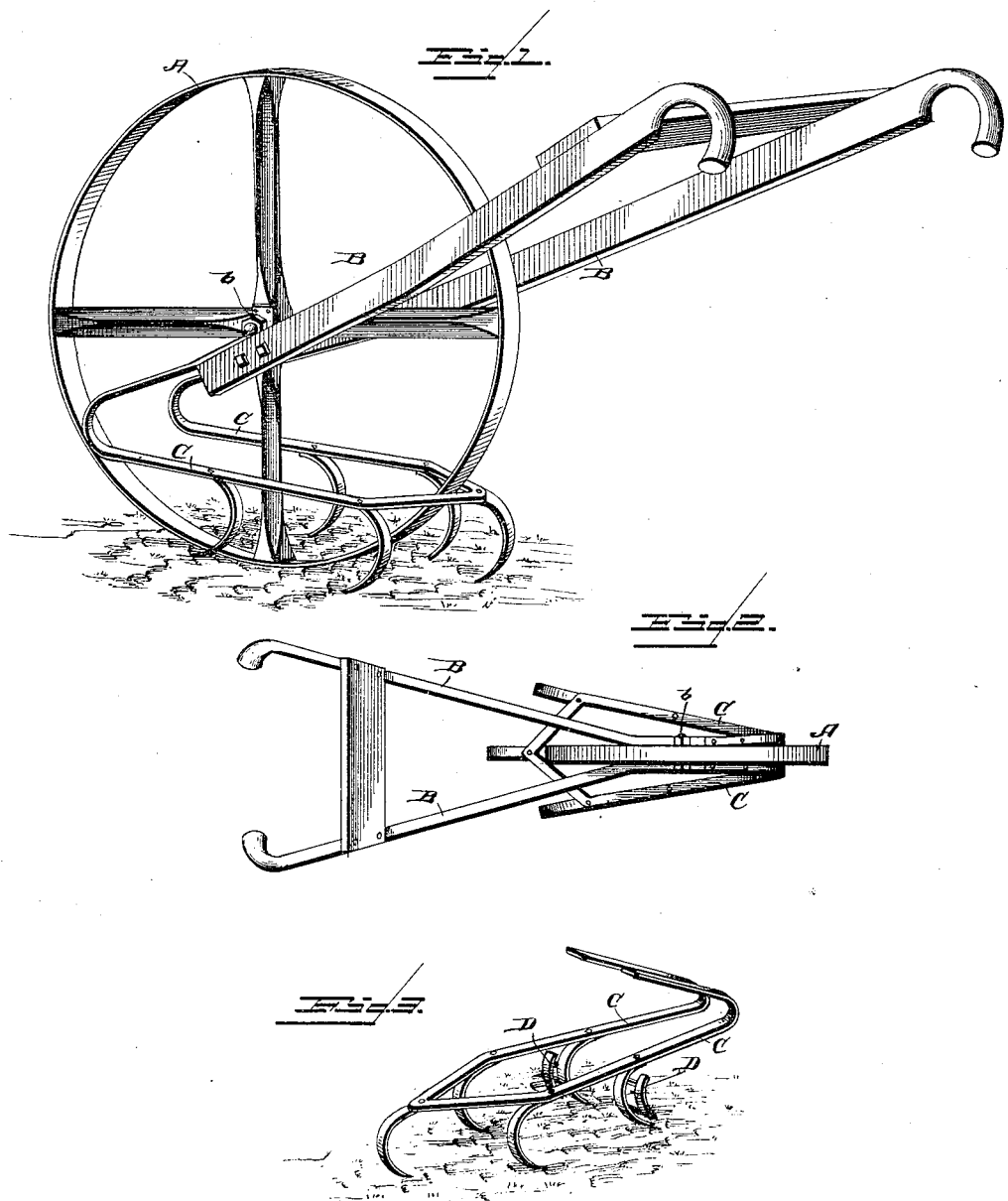

UNITED STATES PATENT OFFICE.

ROBERT C. BUCKLEY, OF PEORIA, ILLINOIS.

WHEEL-CULTIVATOR.

SPECIFICATION forming part of Letters Patent No. 403,414, dated May 14, 1889.

Application filed January 21, 1889. Serial No. 297,055. (No model.)

*To all whom it may concern:*

Be it known that I, ROBERT C. BUCKLEY, a citizen of the United States, residing at Peoria, in the county of Peoria and State of Illinois, have invented certain new and useful Improvements in Wheel-Cultivators, of which the following is a full, clear, and exact description, such as will enable others skilled in the art to which it appertains to make and use the same.

This invention relates to wheel-plows.

The object of the invention is to produce a frame for wheel plows or cultivators of such construction that the entire weight of the frame and attachments shall come directly upon and bear in a vertical line on the axle of the wheel, in order that the implement may be rendered steady in use, and so balanced as to prevent the necessity of exertion on the part of the user in keeping the implement in position while in use.

With these objects in view the invention resides, essentially, in a plow or cultivator frame comprising a wheel, handles having bearings for the wheel near their lower ends, and supports or hangers attached to the handles at each side of the axle and depending in such position as to bring the cultivator-teeth or plowshare in vertical plane with the axle.

I have illustrated the invention in the accompanying drawings, in which—

Figure 1 is a perspective view of my invention. Fig. 2 is a plan view, and Fig. 3 is a detail view showing fenders employed.

In the drawings, A represents a wheel of suitable size and strength to support the parts of the machine and withstand the strain incident to the use of the implement.

B B represent beams or arms, one on each side of the wheel and formed at their upper ends into handles to be grasped by the operator. At a short distance from the lower end of the beams are fixed brackets $b$, in which are the bearings of the axle of the wheel A.

C represents hangers, one of which is placed on each side of the wheel. The forward one on each side is attached to the beam at a point front of the axle of the wheel, and the other is attached at a point in rear of the axle. These hangers depend from the beams in such manner as to bring the cultivator-teeth or the like to whose frame they are secured directly beneath the axle of the wheel, so that the implement when at work is perfectly balanced, and unequal strain, tending to deviate the cultivator from a straight line, is avoided.

D represents fenders, which are attached to the outer portion of the frame of the cultivator, and which prevent the turning down of plants between which the implement is used.

Having thus fully described my invention, what I claim as new, and desire to secure by Letters Patent, is—

1. In a wheel-cultivator, the supporting-wheel, the frame mounted thereon, and the cultivator-teeth attached to the frame in line with the vertical plane of the axle of the wheel, whereby the weight of the frame and the strain incident to the use of the cultivator-teeth are brought directly on the axle of the wheel, substantially as described.

2. In a wheel-cultivator, the wheel, the frame attached thereto, the beams formed at their upper ends into handles and provided on each side of the axle of the wheel with hangers, and the cultivator-teeth attached to the hangers and arranged in vertical plane with the axle of the wheel, substantially as and for the purposes set forth.

In testimony whereof I affix my signature in presence of two witnesses.

ROBERT C. BUCKLEY.

Witnesses:
C. E. BUTTS,
ABBOTT MCKINNEY.